United States Patent

Williams

[11] Patent Number: 5,864,861
[45] Date of Patent: Jan. 26, 1999

[54] METHOD AND SYSTEM FOR STORING VARIABLE LENGTH RECORDS IN THE MEMORY OF A PORTABLE TELEPHONE THROUGH DEFRAGMENTATION

[75] Inventor: Stephen Harry Williams, Surrey, England

[73] Assignee: Nokia Mobile Phones Ltd., Salo, Finland

[21] Appl. No.: 768,280

[22] Filed: Dec. 18, 1996

[30] Foreign Application Priority Data

Dec. 22, 1995 [GB] United Kingdom ............... 9526458

[51] Int. Cl.$^6$ ................................. G06F 12/06
[52] U.S. Cl. ...................... 707/101; 707/202; 711/2; 711/110; 711/173; 379/387
[58] Field of Search ...................... 707/101, 202; 711/2, 173, 110; 379/387; 395/181

[56] References Cited

U.S. PATENT DOCUMENTS

| | | | |
|---|---|---|---|
| 3,678,462 | 7/1972 | Condon et al. ......................... | 711/110 |
| 5,163,082 | 11/1992 | Karnowski ............................ | 379/88 |
| 5,182,769 | 1/1993 | Yamaguchi et al. ................... | 379/387 |
| 5,349,697 | 9/1994 | Pelkonen .............................. | 455/89 |
| 5,542,042 | 7/1996 | Manson ................................ | 395/181 |
| 5,548,751 | 8/1996 | Ryu et al. ............................. | 707/102 |
| 5,625,819 | 4/1997 | Hoffer, Jr. et al. ................... | 707/202 |

OTHER PUBLICATIONS

Thesen et al., "Predicting the availability of contiguous memory", International Journal of Computer & Information Sciences, vol. 6, No. 4, Abstract only, 1977.

Primary Examiner—Thomas B. Black
Assistant Examiner—Jean R. Homere
Attorney, Agent, or Firm—Perman & Green, LLP

[57] ABSTRACT

A portable radio telephone apparatus and including a first memory and a second memory for storing variable length records and validity confirmation indicators, indicating confirmed or unconfirmed validity, associated with each record, and memory defragmentation for identifying a first record in the first memory which is adjacent an available memory fragment; providing a second record in the second memory which is a duplicate of the first record having its validity confirmation indicator set to unconfirmed validity; setting the validity confirmation indicator of the second record to confirmed validity; setting the validity confirmation indicator of the first record to unconfirmed validity; providing a third record in the first memory at the location of said available memory fragment having its validity confirmation indicator set to unconfirmed validity; setting the validity confirmation indicator of the third record to confirmed validity; and setting the validity confirmation indicator of the second record to unconfirmed validity.

6 Claims, 6 Drawing Sheets

METHOD AND SYSTEM FOR STORING VARIABLE LENGTH RECORDS IN THE MEMORY OF A PORTABLE TELEPHONE THROUGH DEFRAGMENTATION

BACKGROUND OF THE INVENTION

The present invention relates to memory defragmentation in a portable radio telephone apparatus.

It is common practice in portable radio telephone apparatus to store user names and numbers into records of fixed length. This is wasteful in memory terms as short record entries occupy the same amount as long record entries.

To overcome this problem, variable length records can be employed. Variable length records occupy approximately only the memory space of the record entries which they are required to store. Because of the nature of variable length records, repeated storing and deletion of records causes memory fragmentation which if left unchecked will eventually lead to loss of storage capacity. To prevent this from happening some form of memory management scheme must be carried out to defragment the memory and restore contiguous record storage. All possible defragmentation schemes must relocate the records within the memory space. Record relocation in the field, portable radio telephone apparatus is problematic because of the ever-present threat of the user disrupting the power supply by removing the battery. If the battery were removed during record relocation, record data is highly likely to be lost irretrievably.

SUMMARY OF THE INVENTION

The present invention deals with this threat by providing a memory defragmentation technique which, even in the event that the power supply of the telephone apparatus being removed at any random moment during record relocation, allows for full recovery when the power supply is restored without any possibility of data loss.

In one aspect, there is provided a portable radio telephone apparatus including a first memory means and a second memory means for storing variable length records and validity confirmation indicators, indicating confirmed or unconfirmed validity, associated with each record, the apparatus being adapted to perform a method of defragmenting the first memory means involving the steps of:

(a) identifying a first record in the first memory means which is adjacent an available memory fragment;

(b) providing a second record in the second memory means which is a duplicate of the first record having its validity confirmation indicator set to unconfirmed validity;

(c) setting the validity confirmation indicator of the second record to confirmed validity;

(d) setting the validity confirmation indicator of the first record to unconfirmed validity;

(e) providing a third record in the first memory means at the location of said available memory fragment having its validity confirmation indicator set to unconfirmed validity;

(f) setting the validity confirmation indicator of the third record to confirmed validity; and (g) setting the validity confirmation indicator of the second record to unconfirmed validity.

The first memory means and the second memory means can form part of the same memory device, for example, an EEPROM.

Preferably, the validity confirmation indicators are located in the same memory space as the associated record, so as to be duplicated when the associated record is duplicated. This need not be the case and the validity confirmation indicators can be stored in a fixed portion of memory. The validity confirmation indicators may be in the form of a validity confirmation bit.

When deleting a record from the first memory means, a record can be deleted by setting its associated validity confirmation indicator to unconfirmed validity. An adjacent record having confirmed validity can then be identified. The adjacent record may be above or below the deleted record. The above method can then be applied to the memory to shuffle the adjacent record into the memory fragment occupied by the deleted record, thereby creating a new memory fragment. The method can then be repeatedly applied until the memory fragment is shuffled to the end of the memory occupied by records and thus eliminated.

BRIEF DESCRIPTION OF THE DRAWINGS

Exemplary embodiments of the invention are hereinafter described with reference to the accompanying drawings, in which.

DESCRIPTION OF THE PREFERRED EMBODIMENT

Figure 1:
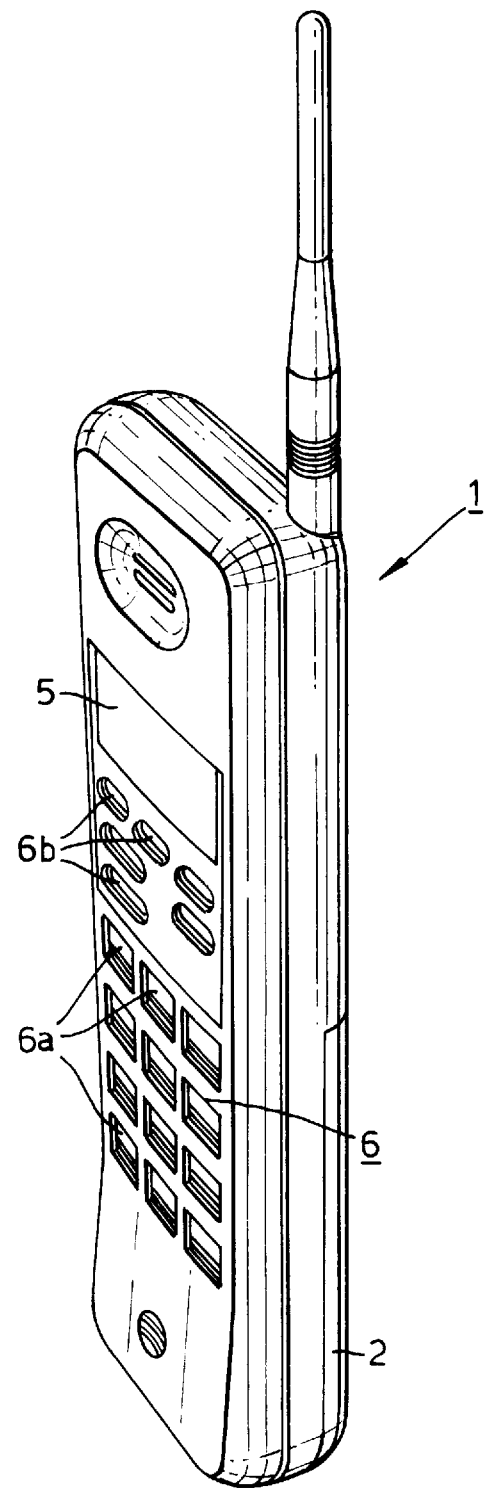
FIG. 1 shows a perspective view of a portable cellular telephone in accordance with the invention.
Figure 2:
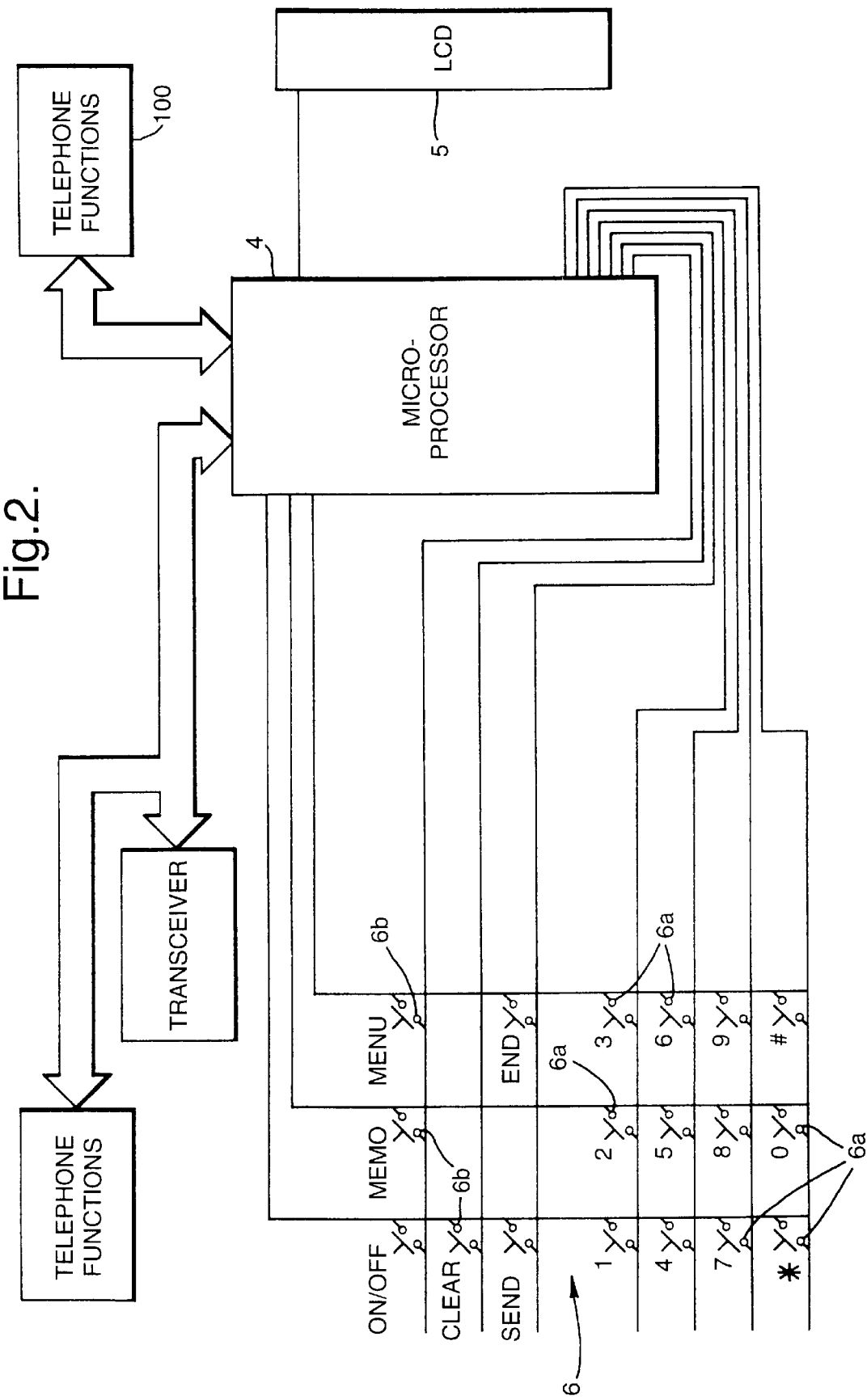
FIG. 2 shows a schematic diagram of the main features in the FIG. 1 telephone.

The telephone apparatus shown in FIG. 1 is a portable cellular telephone 1 powered by a removable and rechargeable battery pack 2. The telephone 1 includes a transceiver and all the other features conventionally found in a cellular telephone, as shown schematically in FIG. 2. Since these aspects of the telephone are not directly relevant to the instant invention no further details will be given here, except to say that a microprocessor 4 (see FIG. 2) is employed to control all the basic functions of the telephone 1 and to control the keypad and display functions. Alternatively, however, the telephone functions may be controlled by a master microcomputer, while the keypad and display functions are under the control of a separate slave microcomputer. Additionally an EEPROM memory 10 is provided for storing user telephone records. Its structure is described in more detail below.

The user-interface of telephone 1 comprises a display, e.g. a liquid crystal display 5, and a keypad 6 on the front of the telephone 1. The display is coupled to and regulated by the microprocessor 4. The keypad 6 essentially comprises two main sets of keys, namely alphanumeric keys 6a associated with alphanumeric data especially for dialling telephone numbers, but also for entering alphanumeric data into the telephone number store 10; and a set of function keys 6b for enabling various predetermined functions or operations.

The keys 6a are arranged in four rows of three keys each. The top row comprises keys for numbers 1, 2 and 3 respectively, the second row down for numbers 4, 5 and 6 respectively, the next row down for numbers 7, 8 and 9 respectively, and the bottom row for *, 0 and # respectively. The keys 6a are also associated with alphabet information. The alphabetic rather than numeric data is selected for example by preceding the alphanumeric keystroke with another predetermined keystroke or set of keystrokes.

The keys can be operated in any conventional way to enter the data making up each telephone record.

Figure 3:
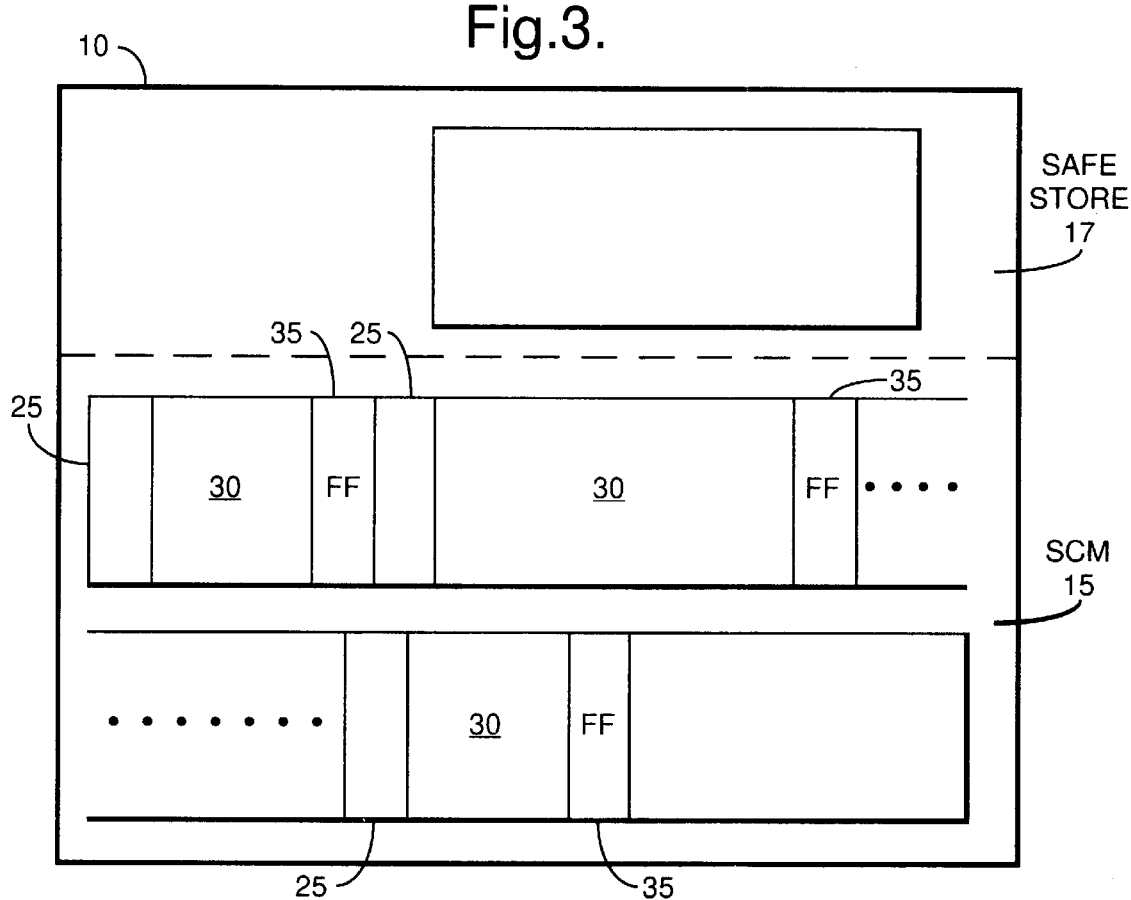
FIG. 3 shows a schematic diagram of the memory structure in the FIG. 1 telephone.

The organisation of the EEPROM memory 10 in which the telephone records are stored will be described with reference to FIG. 3.

The memory 10 is divided into two areas, a large main store 15 referred to as the short code memory or SCM 15 and a smaller auxiliary store referred to as a safe store (SS) 17. The SCM 15 stores contiguously a plurality of variable length telephone records 20, each comprising a header field 25, a data field of variable length 30 and a separator field 35. The header field contains in its seven LSB's the records logical number by which, for example, the user can refer to it. The MSB of the contains a validity confirmation indicator but, the function of which is described in greater detail below. The data field 30 contains the data associated with the record. The sub-fields making up the data field 30 have not been illustrated in any further detail, but may comprise, for example, a name field and a number field. Other fields such a call count filed or an instruction field, as described in the applicants patent specifications EP 494,526 and EP 494,525 may also be included as part of the data field. The separator field 35 contains a predetermined word FF which marks the end of a record.

Figure 4:
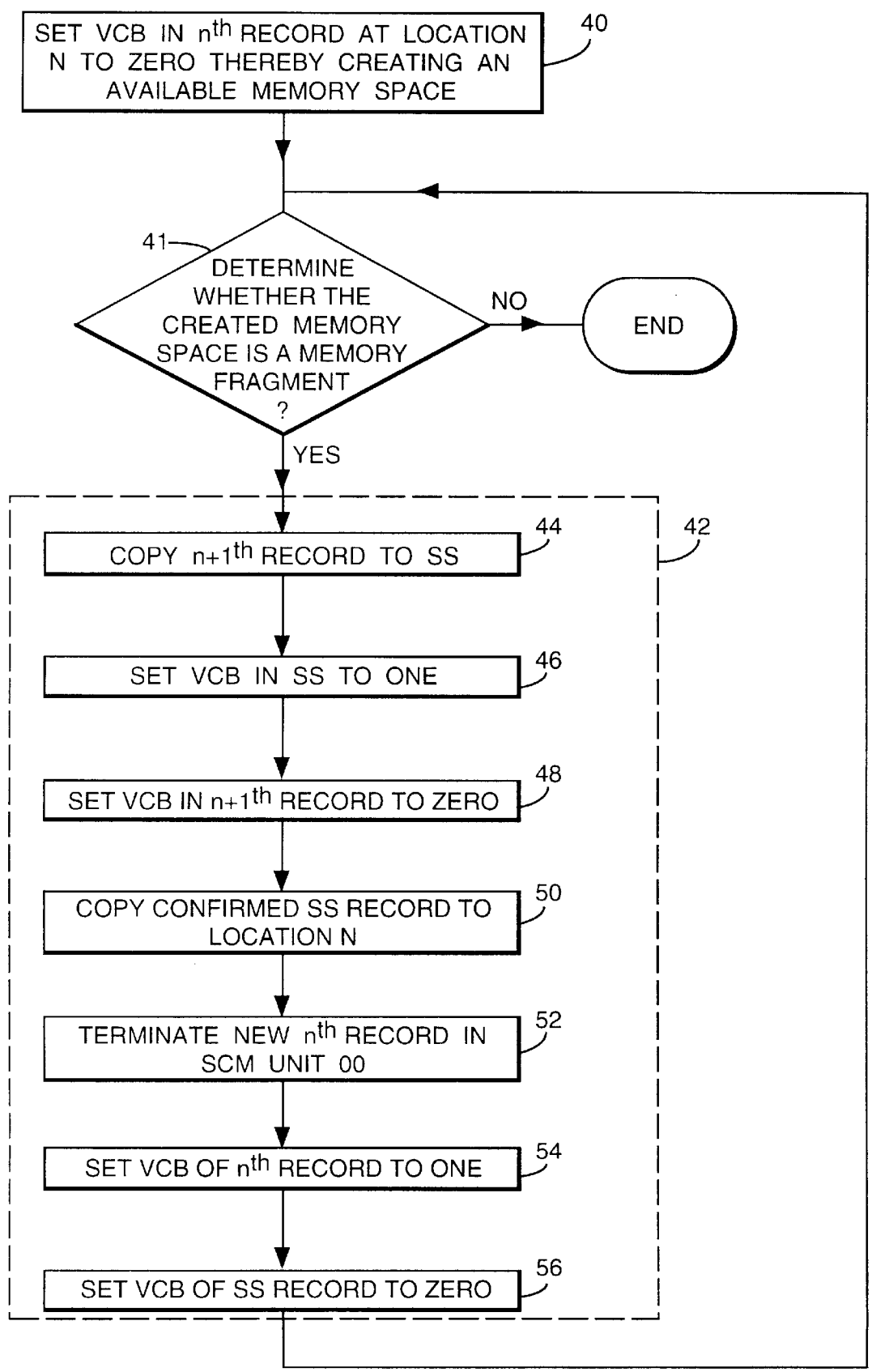
FIG. 4 shows a flow diagram illustrating the steps required in relocating a record in accordance with the invention.

FIG. 4 illustrates the method performed by the microprocessor 4 on deletion of an arbitrary $n^{th}$ record stored at address N in the SCM 15.

FIGS. 5(a–c) illustrates frozen snapshots of the memory 10 at various stages during the performance the method shown in FIG. 4. In FIG. 5, the presence of a bar in the header field 25 indicates that the validity confirmation bit is set to one indicating that the validity of the associated record is confirmed, and the absence of the bar in the header field 25 indicates that the validity confirmation bit is set to zero to indicate that the validity of the associated record is unconfirmed.

The $n^{th}$ record happens to be, in this instance, record 21. Record 21 is deleted by setting its associated confirmation bit to zero, as shown by step 40 in FIG. 4. Thus, the memory space, starting at address N, freed by the deletion of record 16 becomes an available memory space. Next, it has to be determined in step 41 whether the memory space which has been made available is a memory fragment, i.e. whether a record with confirmed validity exists higher up in the memory 10. If the answer is no, then no further defragmentation steps are necessary and the method is terminated at step 60. If the answer is yes, other records need to be reshuffled in the memory 10 to make use of this memory fragment. Dotted box 42 encloses the steps necessary to relocate the n+1$^{th}$ record, record 16, into the memory fragment. These steps are as follows.

Figure 5A:
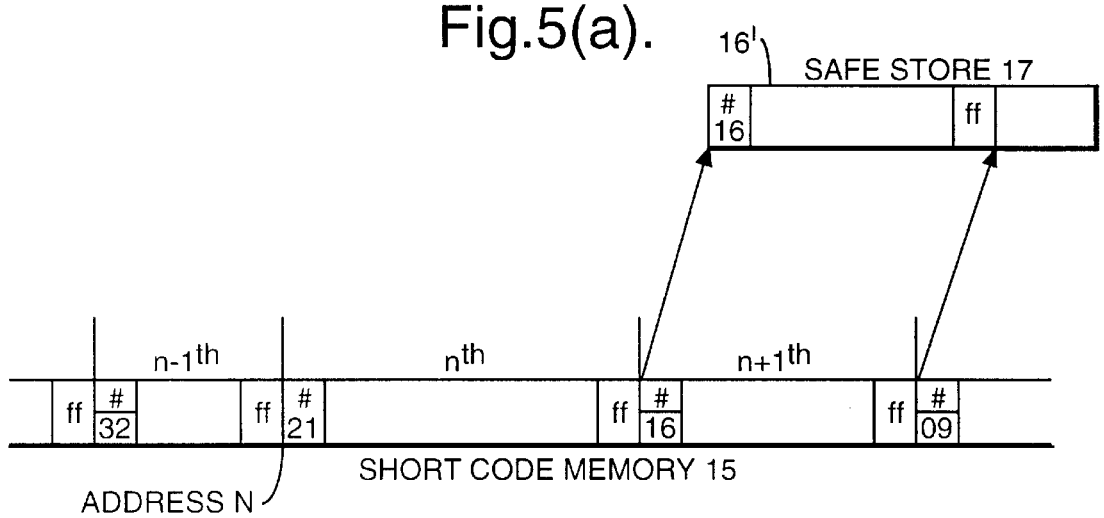
FIG. 5 (a–c) show the memory of the FIG. 1 telephone at various stages during record relocation.

Step 44 places a duplicate of the record 16 referred to as record 16' into the safe store 17 with the validity confirmation bit set to zero. FIG. 5(a) shows the memory 10 frozen at this stage.

Figure 5B:
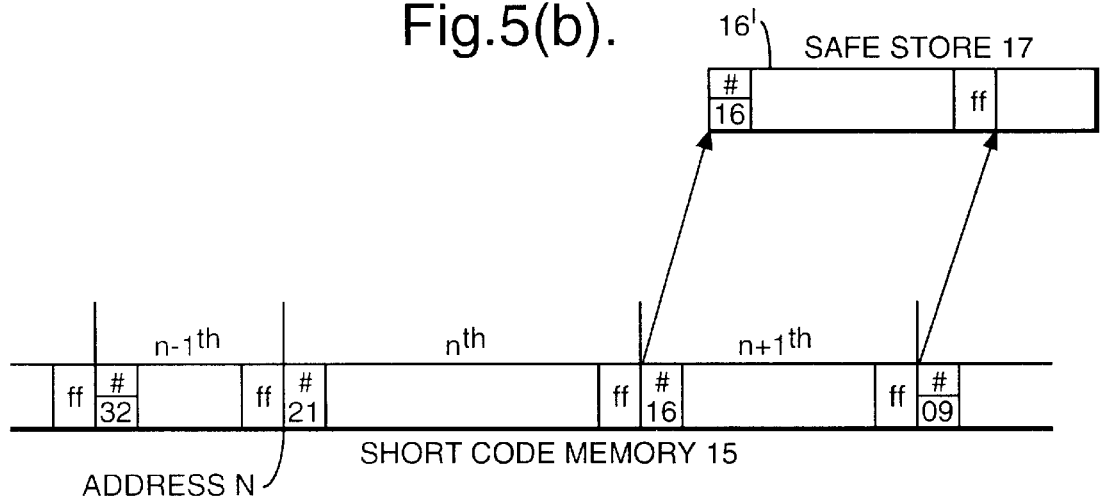

Next, step 46 sets the validity confirmation bit of the record 16' in the safe store 17 to one. Then, the validity confirmation bit of the record 16 in the SCM 15 is set to zero in step 48. FIG. 5(b) shows the memory 10 frozen at this stage.

Figure 5C:
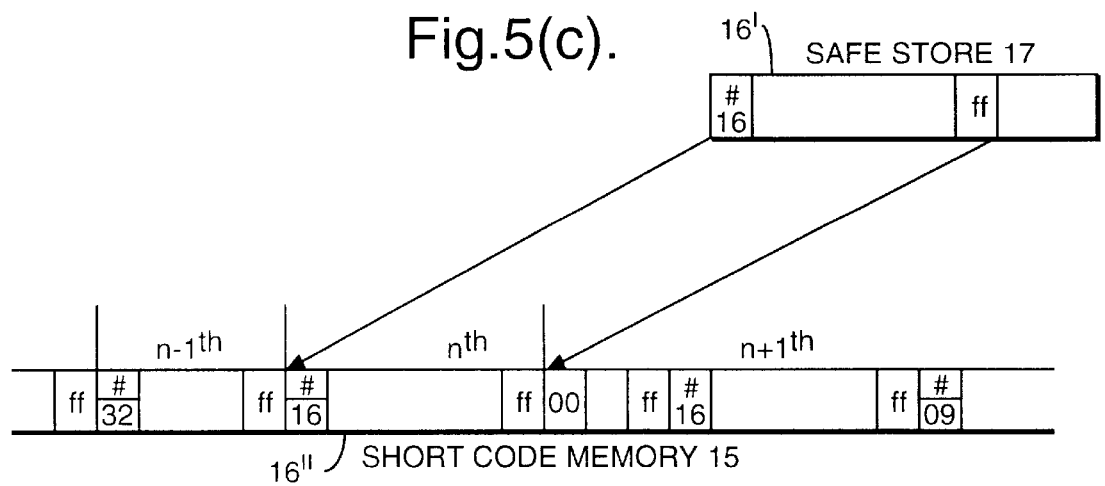

Next, the record 16' in the safe store 17 is copied with its validity confirmation bit set to zero to location N in the SCM 15 in step 50. This record is then referred to as record 16". Then, in step 52, a marker field 00 is tagged onto the end of record 16". Step 54 sets the validity confirmation bit of the record 16" to one. Finally, step 56 sets the validity confirmation bit of record 16' in the safe store 15 to zero. FIG. 5(c) shows the memory 10 frozen at this stage.

Thus, the result of the step defined in box 42 is to fill the memory fragment at address N created by the deletion of record 21 with record 16", which is an exact duplicate of record 16.

The method then returns to step 41 and determines that a new memory fragment has been created extending from the address containing marker field 00 to the next record containing a validity confirmation bit set to one, i.e. record 9.

It will thus be appreciated that the method proceeds around the loops comprising steps 41 and 42 until the last/highest record in memory having a validity confirmation bit set to one is relocated and then terminates at step 60, defragmentation having been completed.

This approach to defragmenting the memory 10 after deletion of a record is advantageous in that, if at any instant after the completion of step 40 the battery 2 of the cellular telephone is removed sufficient redundancy is built into the defragmentation procedure to permit the microprocessor 4 to determine where it was in the defragmentation process prior to the disruption of power and so continue with memory defragmentation after power is restored without any data loss.

Figure 6:
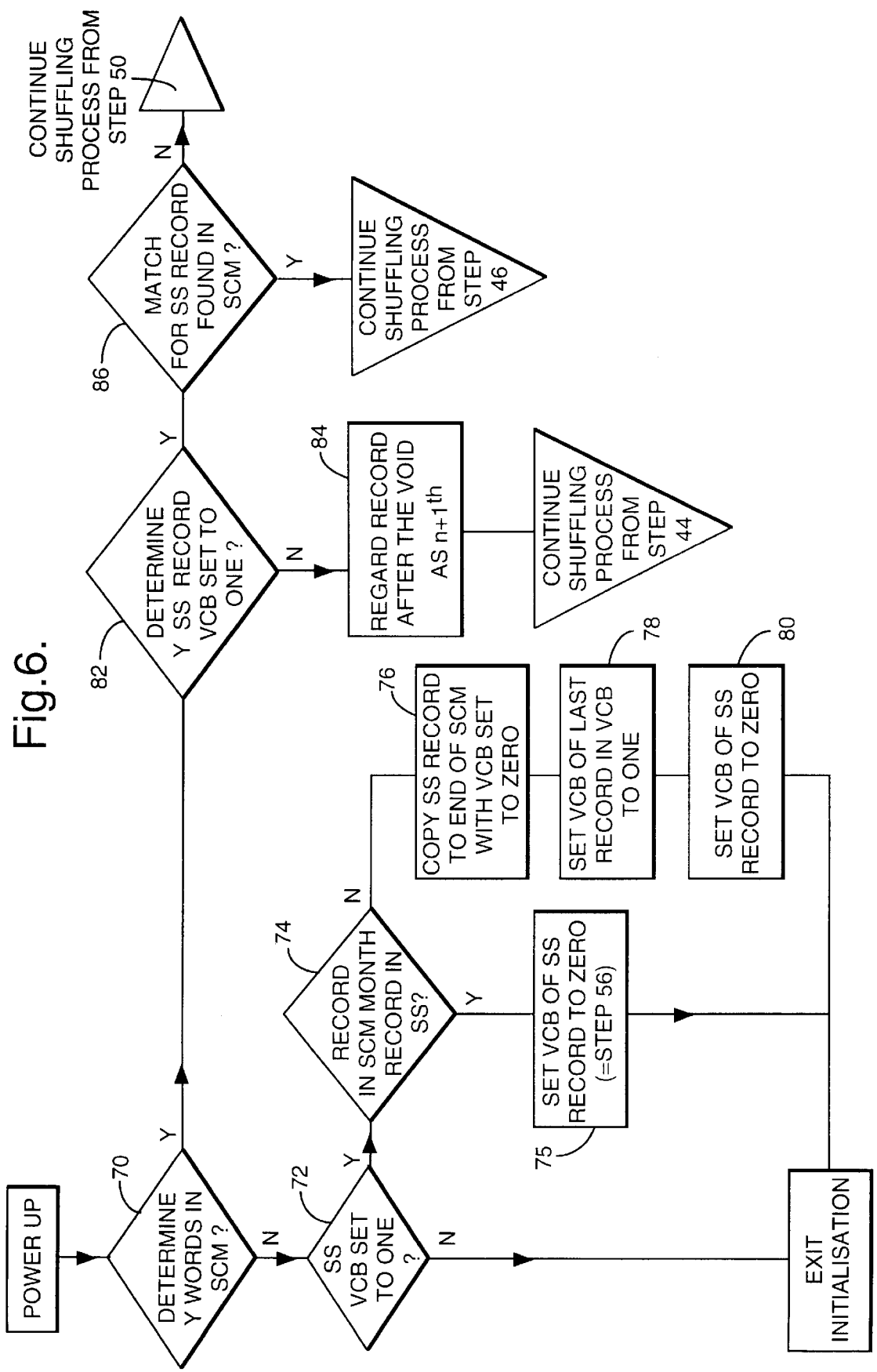
FIG. 6 shows an initialisation and recovery method for the FIG. 1 telephone.

This is illustrated by the initialisation and recovery method shown in FIG. 6.

On powering up the cellular telephone 1, the memory 10 is scanned in step 70 to determine the presence of any memory fragments or voids in the SCM 15. This is achieved by searching for validity confirmation bits which are set to zero. The location of the header fields 25, containing the validity confirmation bits, are straightforward to establish as they always immediately succeed a record separator field 35, i.e. an FF.

If there are no memory fragments in the SCM 15, the safe store 17 is interrogated in step 72. If the safe store 17 contains a record having a validity confirmation bit set to zero, then the power supply was not cut-off during the defragmentation process and no recovery steps need be taken. If, on the other hand, the safe store 17 does contain a record having a validity confirmation bit set to one, then the power supply must have been cut-off when the defragmentation process was nearing its completion. If a match in step 74 for the record in the safe store 17 is found in the SCM 15, then the power supply must have been cut-off between step 54 and the completion of step 56, whereby all that is necessary for the completion of the defragmentation process is the setting of the validity confirmation bit of the record in the safe store 17 to zero in step 75. If a match in step 74 for the record in the safe store 17 is not found in the SCM 15, then the power supply must have been cut-off between the completion of step 46 and 54, whereby for the completion of the defragmentation process, the record in the safe store 17 must be copied to the end of the records of confirmed validity in the SCM 15 with its validity confirmation bit set to zero in step 76, the validity confirmation bit of the copy in the SCM 15 having its confirmation bit set to one in step 78, and the validity confirmation bit of the record in the safe store 17 set to zero in step 80.

However, if step 70 determines that there are fragments in the SCM 15, then the defragmentation process was under way and only partially complete. The safe store 17 is then interrogated in step 82. If the safe store 17 does not contain a record having a validity confirmation bit set to one, then the power supply was cut-off between step 40 and the completion of step 46, whereby the record after the void is regarded as the n+1$^{th}$ record in step 84 and the defragmentation process is then continued from step 44. If the safe store 17 does contain a record having a validity confirmation bit set to one then the power supply was cut-off between the completion of step 46 and the completion of step 56. If a match in step 86 for the record in the safe store 17 is found when in the SCM 15, the power supply was cut-off between the completion of step 54 and step 56, whereby the defragmentation process must be continued from step 56. If a match in step 86 for the record in the safe store 17 is not found in the SCM 15, the power supply was cut-off between the completion of step 48 and the completion of step 54, whereby the defragmentation process must be continued from step 50.

What we claim is:

1. A portable radio telephone apparatus and including a first memory means and a second memory means for storing variable length records and validity confirmation indicators, indicating confirmed or unconfirmed validity, associated with each record, and memory defragmenting means for:

(a) identifying a first record in the first memory means which is adjacent an available memory fragment;

(b) providing a second record in the second memory means which is a duplicate of the first record having its validity confirmation indicator set to unconfirmed validity;

(c) setting the validity confirmation indicator of the second record to confirmed validity;

(d) setting the validity confirmation indicator of the first record to unconfirmed validity;

(e) providing a third record, which is a duplicate of the second record, in the first memory means at the location of said available memory fragment having its validity confirmation indicator set to unconfirmed validity;

(f) setting the validity confirmation indicator of the third record to confirmed validity; and (g) setting the validity confirmation indicator of the second record to unconfirmed validity.

2. Apparatus as in claim 1, wherein the available memory fragment is a record having its validity confirmation indicator in a state of unconfirmed validity.

3. Apparatus as in claim 2, wherein the memory defragmenting means operates repeatedly until no available fragment exists.

4. Apparatus as in claim 3, wherein an available fragment is created by deletion of a record.

5. Apparatus as in claims 3, further comprising means, which on powering up the apparatus, determines at which point in the defragmentation process the power supply was interrupted and facilitates continued defragmentation from that point.

6. A method of defragmenting memory in a portable radio telephone apparatus and including a first memory means and a second memory means for storing variable length records and validity confirmation indicators, indicating confirmed or unconfirmed validity, associated with each record, the method involving the steps of:

(a) identifying a first record in the first memory means which is adjacent an available memory fragment;

(b) providing a second record in the second memory means which is a duplicate of the first record having its validity confirmation indicator set to unconfirmed validity;

(c) setting the validity confirmation indicator of the second record to confirmed validity;

(d) setting the validity confirmation indicator of the first record to unconfirmed validity;

(e) providing a third record, which is a duplicate of the second record, in the first memory means at the location of said available memory fragment having its validity confirmation indicator set to unconfirmed validity;

(f) setting the validity confirmation indicator of the third record to confirmed validity; and (g) setting the validity confirmation indicator of the second record to unconfirmed validity.

* * * * *